(12) United States Patent
Jamison et al.

(10) Patent No.: US 12,007,368 B2
(45) Date of Patent: Jun. 11, 2024

(54) FRAGILE AND NORMAL VISCOELASTIC COMPONENTS OF DRILLING FLUID GELS

(71) Applicant: HALLIBURTON ENERGY SERVICES, INC., Houston, TX (US)

(72) Inventors: Dale E. Jamison, Humble, TX (US); Sandeep Kulkarni, Kingwood, TX (US); Xiangnan Ye, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 240 days.

(21) Appl. No.: 16/971,274

(22) PCT Filed: Sep. 24, 2019

(86) PCT No.: PCT/US2019/052555
§ 371 (c)(1),
(2) Date: Aug. 19, 2020

(87) PCT Pub. No.: WO2021/061099
PCT Pub. Date: Apr. 1, 2021

(65) Prior Publication Data
US 2023/0100155 A1  Mar. 30, 2023

(51) Int. Cl.
*G01N 3/56* (2006.01)
*E21B 21/08* (2006.01)
(Continued)

(52) U.S. Cl.
CPC ............... *G01N 3/56* (2013.01); *E21B 21/08* (2013.01); *G01N 3/34* (2013.01); *G01N 11/14* (2013.01);
(Continued)

(58) Field of Classification Search
CPC . G01N 3/34; G01N 3/56; G01N 11/00; G01N 11/02; G01N 11/14;
(Continued)

(56) References Cited

U.S. PATENT DOCUMENTS 4,612,800 A   9/1986 Erian
4,829,811 A   5/1989 Ehlert et al.
(Continued)

FOREIGN PATENT DOCUMENTS

CN   103740584 A  *  4/2014  ........... C12M 23/38
CN   211816243 U  *  10/2020
RU     2347069 C2  *  2/2009  ............... C09K 8/52

OTHER PUBLICATIONS

Fernandez and et al. Integrated drilling system using mud actuated down hole hammer as primary engine. Novatek, 2005 (Year: 2005).*
(Continued)

*Primary Examiner* — Douglas Kay
(74) *Attorney, Agent, or Firm* — NOVAK DRUCE CARROLL LLP

(57) ABSTRACT

Characterizing the decay of the microstructure of a drilling fluid gel using a model based on two exponential functions. Based on the model, identify at least two components of the decay model comprising a fast decay component and a slow decay component, wherein the fast decay component decays more quickly than the slow decay component. The decay of the microstructure of the gel over a time period can be determined using a rheometer or viscometer. Wellbore processes, including start up and tripping operations can be optimized based on the determination of the fast decay component and/or a slow decay component of the drilling fluid gel.

18 Claims, 4 Drawing Sheets

(51) Int. Cl.
  *G01N 3/34* (2006.01)
  *G01N 11/14* (2006.01)
(52) U.S. Cl.
  CPC ............... *G01N 2203/0025* (2013.01); *G01N 2203/0094* (2013.01)
(58) Field of Classification Search
  CPC .... G01N 2203/0025; G01N 2203/0094; E21B 21/08; E21B 43/2607; E21B 29/10
  See application file for complete search history.

(56) References Cited

U.S. PATENT DOCUMENTS

| | | | |
|---|---|---|---|
| 5,799,734 | A | 9/1998 | Norman |
| 7,456,135 | B2 | 11/2008 | Kirsner et al. |
| 7,462,580 | B2 | 12/2008 | Kirsner et al. |
| 7,534,743 | B2 | 5/2009 | Kirsner et al. |
| 7,645,723 | B2 | 1/2010 | Kirsner et al. |
| 7,696,131 | B2 | 4/2010 | Oyler et al. |
| 2004/0149019 | A1 | 8/2004 | Johnson et al. |
| 2013/0220620 | A1* | 8/2013 | Jamison ................. E21B 43/00 166/305.1 |
| 2016/0058370 | A1* | 3/2016 | Raghuram ........... A61B 5/0002 600/483 |
| 2017/0273886 | A1* | 9/2017 | Gousse ................... A61L 27/50 |
| 2019/0076080 | A1* | 3/2019 | Prado .................... A61B 5/4872 |
| 2019/0307678 | A1* | 10/2019 | Lichter .................. A61K 31/05 |
| 2020/0381594 | A1* | 12/2020 | Roqan ..................... H01L 33/08 |

OTHER PUBLICATIONS

Cayeux and et al, "Toward drilling automation: On the necessity of using sensors that relate to physical models." SPE Drilling & Completion 29, No. 02 (2014): 236-255 (Year: 2014).*
International Search Report and Written Opinion for PCT Application No. PCT/US2019/052555, issued on Jun. 22, 2020, 12 pages.
Ye, Allan & Kleinguetl, Kevin & Kulkarni, Sandeep; "Gel strength measurement for drilling fluid: reform of gel microstructure"; AADE-15-NTCE-04 (2015).
Mainardi, F. & Spada, G. Eur. Phys. J. Spec. Top; "Creep, relaxation and viscosity properties for basic fractional models in rheology"; 193: 133-160 (2011).

* cited by examiner

FRAGILE AND NORMAL VISCOELASTIC COMPONENTS OF DRILLING FLUID GELS

CROSS-REFERENCE TO RELATED APPLICATIONS

This application is a national stage entry of PCT/US2019/052555 filed Sep. 24, 2019, said application is expressly incorporated herein by reference in its entirety.

FIELD

The present application is related to drilling fluids, and in particular to gel structures within the drilling fluid, measurement of such gel structures, and the impact on drilling.

BACKGROUND

Drilling fluids are used within a drilling device when drilling a wellbore. Drilling fluids provide lubrication to the components of the drill, while also removing portions of the formation that are cut by the drill, referred to as cuttings. Early in the industry, most drilling fluids were simple suspensions of water, viscosity building clays and weighting materials like barite. Wellbore pressure management with such fluids was largely focused on maintaining a surface density and a rudimentary viscosity parameter using a Marsh funnel. In more recent periods, drilling fluids are more complex and performance requirements more challenging.

Most drilling fluids and many other wellbore servicing fluids have gel structures that form when the fluids are quiescent. Gel structures are usually thixotropic (time dependent), with some fluids having extended gelation times that can require hours to fully develop. It is common practice in the field to measure gels using a FANN® 35 viscometer. Traditional measurements are performed using 10 s, 10 min., and 30 min gelation times. Historically, these measurements have been the basis for modeling a fluid's hydraulics performance during start-up and tripping operations. Tripping, or tripping pipe, refers to pulling a drill out of a wellbore, and then inserting back into the wellbore to continue drilling.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
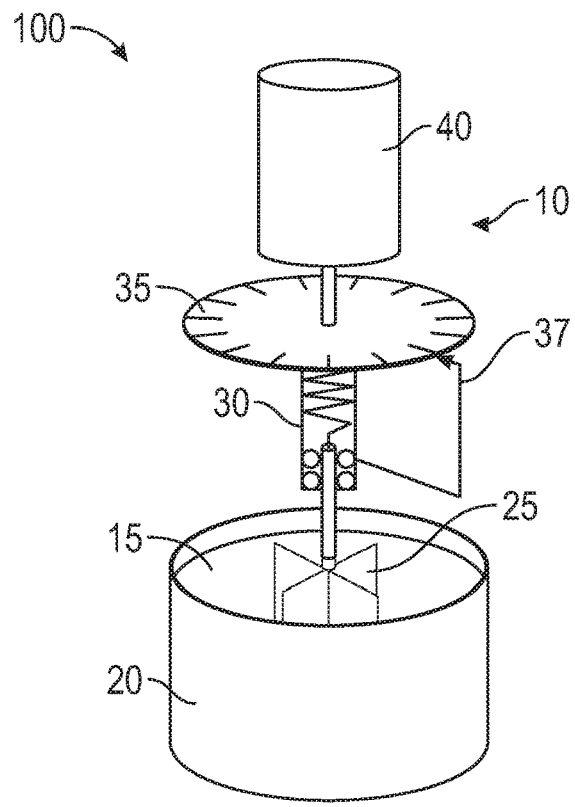
FIG. 1 is a schematic of an exemplary fluid testing system for determining the decay of a microstructure of a gel over a time period according to the present disclosure.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Disclosed herein is a method for determining the structural decay of drilling fluid gels, and in particular determining and solving a model having two exponential decay functions which characterizes the decay of the drilling fluid. These two exponential functions characterize different components of the drilling fluid gel, namely a fast decaying fragile component and a slow decaying normal viscoelastic component, also referred to herein as a conventional component. Drilling fluid gels disclosed herein are thixotropic, and as such are thick and viscous at rest, but when placed under shear stress, the structure of the gel breaks down causing it to become thin and less viscous. In developing such drilling fluid gels there are competing interests. For instance, on one hand it is desirable to have a fluid that has a strong and quickly forming gel to enable good cuttings transport and suspension, on the other hand, when pumping starts or during tripping operations it is desirable for the gel structures to degrade as quickly as possible to minimize potentially higher equivalent circulating density (ECD). Too high an ECD may induce fracture in the formation, kicks or circulation loss events in the wellbore. Drilling fluids that address such balance, namely providing drilling fluid gels which promote cuttings suspension and sag mitigation, yet provides a structure that requires very little disturbance to disrupt the structure, may be referred to in the field as fragile gels.

As disclosed herein, the gel microstructure of drilling fluids and the speed at which the microstructure of the gel degrades (breaks under stress) may be a design criteria for formulation and composition of a drilling fluid gel. In particular, the timing between forming a viscous gel having mechanical strength on one hand, and the complete breaking down of its microstructure such that it flows on the other, impact the timing of various wellbore processes, such as drilling startup and tripping operations. Therefore, by determining the microstructural decay of the different components of the drilling fluid gel, wellbore processes can be improved and optimized, such as drilling start up times, and drill pump start up times.

For instance, upon drilling start up or tripping operations, there can be significant down time. Such time may be sufficient for the drilling fluid to form a viscous gel with an intact and fully formed microstructure. Therefore, prior to starting drilling, or during tripping operations, the structure of the drilling fluid may form a strong gel. When starting, or re-starting, such operations, pump rates are gradually increased to a steady state and/or predetermined rate. The premature activation, namely, too great a graduated increase of pump rate, in which a pump injects drilling fluid into a drilling device may result in high ECD, high pressures, and damage to the formation. Often, out of precaution, operators wait too long before activating drilling pumps after initiating the drilling device. With the modeling of the gel structures as disclosed herein, pump rate from initial start until the steady state can be optimized. As disclosed herein, different components of the drilling fluid may be determined which decay at different rates under shear stress. For instance, the drilling fluid gel may have a fast decaying fragile component and a slow decaying conventional component. With the determination of such components, the speed of the degradation of the drilling fluid can be understood and operators may be able to activate pumps sooner, and thus speed drilling operations and reduce the time for tripping operations, down time or start up times.

Accordingly, the method disclosed herein enables the characterization of the nature of such drilling fluid gels, in particular, the hydraulic performance of such fluids. Consequently, by determining the structural decay of the drilling fluid gel components, the timing of wellbore process may be improved. For instance, starting a pump quickly or slowly includes the rate at which the pump gradually increases or decreases its pumping rate, such as from its start-up point to reach a predetermined pumping rate, and/or a wait time before starting or stopping the pump from a point in time, such point in time including or based on starting a drilling device.

In order to model the decay of the microstructure of a gelled fluid, and its effect on gel strength and viscosity, a rheometer or viscometer may be employed to induce stress on the gel and measure the decay after the peak gel strength of the gel is reached. In addition to, or alternative to, the peak gel strength and may also be the peak yield point, both of which, for purposes herein, are the point at which the microstructure of the gel breaks. FIG. 1 illustrates a fluid testing system 100 having a rheometer 10 to induce stress on a test fluid gel 15 in a container 20. The rheometer 10 has a vane 25, which may also be a blade or an impeller, or other mechanical component for transmitting shear from the motor 40 to the fluid gel 15. Coupled with the vane 25 is a torsion spring 30 which has a dial 35 and stress indicating dial pointer 37. While a torsion spring is shown, any other spring, coiled spring or bias mechanism can be used which facilities detection of stress induced on the fluid gel 15. Accordingly as the motor 40, which may be an electrical, hydraulic, or gas powered motor, turns the vane 25, which induces stress on the fluid gel 15.

Figure 2:
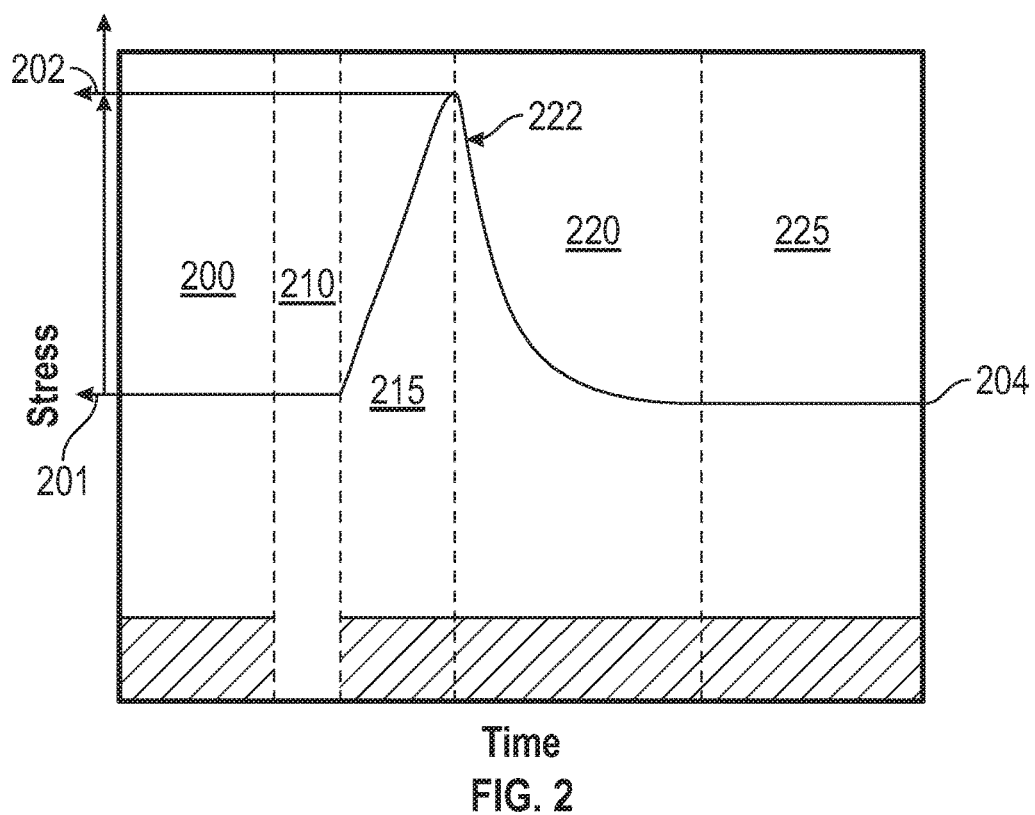
FIG. 2 is an exemplary stress-time graph for characterizing the decay of the microstructure of a gel according to the disclosure herein.

Accordingly, the system 100 may be used to characterize the breakdown and structure of the gelled fluids. FIG. 2 depicts a stress-time graph with which a fluid gel may be characterized using the fluid testing system 100, which shows time along the x-axis and shear stress along the y-axis. Shown in the stress-time graph are a number of time periods, or phases, which are carried out to test a fluid gel. Initially the fluid system is sheared with a vane, such as vane 25 in FIG. 1, at a high rotation per minute (RPM) sufficient to fully break the gel microstructure, which may be the highest available RPM of the system. This steady state sheer stress motor RPM to break the fluid gel is indicated on the y-axis as shear stress 201. This initial time period for shearing the gel structure is shown in FIG. 2 as initial time period 200. After the initial time period 200, the motor of the system may be stopped, thereby ceasing shear, and the fluid is allowed to gel for a resting time period 210. This resting time period 210 may be any one of 10 s, 10 minutes, or 30 minutes, and/or repeated with each of the aforementioned times. While these times are provided as exemplary, other resting time periods may be used to characterize gel.

After time period 210 of resting and gelling time is completed, the motor of the system is turned on at a low RPM for time period 215. The RPM is low such that the vane, such as vane 25 in FIG. 1, is locked into the fluid by the gel microstructure so that it remains still and unmoving. As the motor of the system continuously runs, urging movement of the vane, the spring, such as spring 30 in FIG. 1, coupled to a motor and vane stresses the fluid gel micro structure.

The induced stress on the fluid gel is continuously measured and increases until the peak gel strength 202, which may also be referred to as peak stress, is reached. This peak gel strength 202 is the same as the peak yield stress of the gelled fluid. The shear stress above the shear stress 201 up to the peak gel strength 202 is the gel contribution to the peak stress. Once the peak gel strength is exceeded the gel microstructure will deteriorate and decay. This decay is shown in FIG. 2 as decay time period 220. In particular, when the peak gel strength is exceeded, the decay of the microstructure of the fluid gel permits rotation of the vane. Further, during this decay, the stress induced in the fluid gel decreases as shown by the declining graph line 222. This decay may occur until the microstructure of the fluid gel is completely destroyed, as shown in the final time period 225. In final time period 225, the indicated shear stress 204 is the shear stress after the all of the gel structure has been completely broken by shearing action.

As mentioned, during decay time period 220, the fluid gel is being disrupted by the shearing action of a vane. This decay time period 220 can be modeled to gain information about the gel disruption mechanics.

When the gelled fluid is continuously stressed beyond its peak gel strength an exponential decay of the structure can be seen. In particular, the decay of the microstructure of the gel after reaching the peak gel strength may be modeled using an exponential function. In particular, as disclosed herein it has been found that the decay of the microstructure can be modeled by using two exponential stress decay functions to characterize the fragile and conventional gel disruption components in gel fluids. To develop the model the two exponent model, a series of n exponential decays were summed to model the stress response seen when testing with a fluid gel with a rheometer or viscometer instrument. The general form is:

$$\sigma(t) = \Sigma_{i=0}^{n} A_i e^{-B_i t} + \sigma(t=\infty) \quad (1)$$

wherein

σ is shear stress;

t is time

As mentioned, two exponential decay functions were found to be adequate for modeling drilling fluids. The first is related to the fragile gel response of a gel, while the second part is related to the normal viscoelastic response (conventional response). These can be referred to as the fragile component and the conventional component respectively. This is similar to the Burgers model (combination of spring and dashpot in series and parallel), which has been typically used to describe the creep-recovery behavior. Using this form $B_0$ and $B_1$ are unique values that can be solved using numerical techniques. Numerical techniques include for example least squares regression. At time equal to infinity, the model function $\sigma(t=\infty)$ must reduce to the steady shear value (6) thus:

$$\sigma(t=\infty)=\sigma_{ss}=\text{steady state shear stress} \quad (2)$$

The general form can be refined using two exponential decays. In this case the sum of the constants $A_i$ can be expressed such that their sum is equal to the magnitude of the gel stress, illustrated as follows:

$$\sigma(t=0)=A_0 e^{-B_0 t}+A_1 e^{-B_1 t}+\sigma_{ss} \quad (3)$$

Then:

$$\sigma_{gel}=\sigma(t=0)-\sigma_{ss}=A_0+A_1 \quad (4)$$

Hence, the final model form can be written as:

$$\sigma(t)=(\sigma_{gel}-A_1)e^{-B_0 t}+A_1 e^{B_1 t}+\sigma_{ss} \quad (5)$$

wherein
$\sigma$ is shear stress;
$\sigma_{ss}$ is steady state shear stress;
t is time
$A_1$ is a constant equivalent to a magnitude of the gel stress;
$B_0$ and $B_1$ are decay time constants solved numerically based on the received measured decay of the microstructure of the gel over a time period.

The two exponential stress decay functions $(\sigma_{gel}-A_1)e^{-B_0 t}$ and $A_1 e^{B_1 t}$ characterize the (i) a fragile component and (ii) a conventional decay component of the drilling fluid. The fragile component represents a fast decay component, whereas the conventional component represents a slow decay component of the gel fluid. By obtaining the fragile component and the conventional component using the model, operators can better understand how the fluid gel being used may respond to shear and disruption resulting from wellbore operations, and in particular start up and tripping operations during drilling. Further, the relative magnitudes and work integrals required to disrupt each stress function can be compared as well as the required time for each stress function to be completely reduced to having no effect on measured stress. When modelling hydraulics, the ability to model the time basis of microstructure gel disruption and the stress magnitude of each may assist pump start up and tripping operations. For instance, timing the start or control the rate of pumping based on the decay of the fragile component and/or the conventional component.

Additionally the gel behavior of the fluid may depend on temperature and pressure. For high temperature and high pressure (HTHP) conditions, it may be difficult to directly measure the gel response of the fluid. HTHP conditions may include temperatures of 300° F. or more, or 350° F. or more, or 400° F. or more, and pressures of 10,000 psi or more, or 20,000 psi or more. However, the gel response may be estimated based on the viscosity of the fluid. Such estimation for a given fluid can be determined according to the below correlations:

$$\sigma(T,P) \approx \sigma(T_0, P_0) * \frac{\mu_h(T, P)}{\mu_h(T_0, P_0)} \quad (6)$$

wherein $\mu_h$ is viscosity, T is temperature, and P is pressure. However, the effect of (T,P) on the ratio of fragile to conventional gel components $(A_0/A_1)$ and the decay constants, $B_0$ and $B_1$ may vary.

In view of the above, the characteristics of a drilling fluid gel can be modeled based on the two exponential function as shown in equation (5), and HTHP conditions taken into account as in equation (6).

Figure 3:
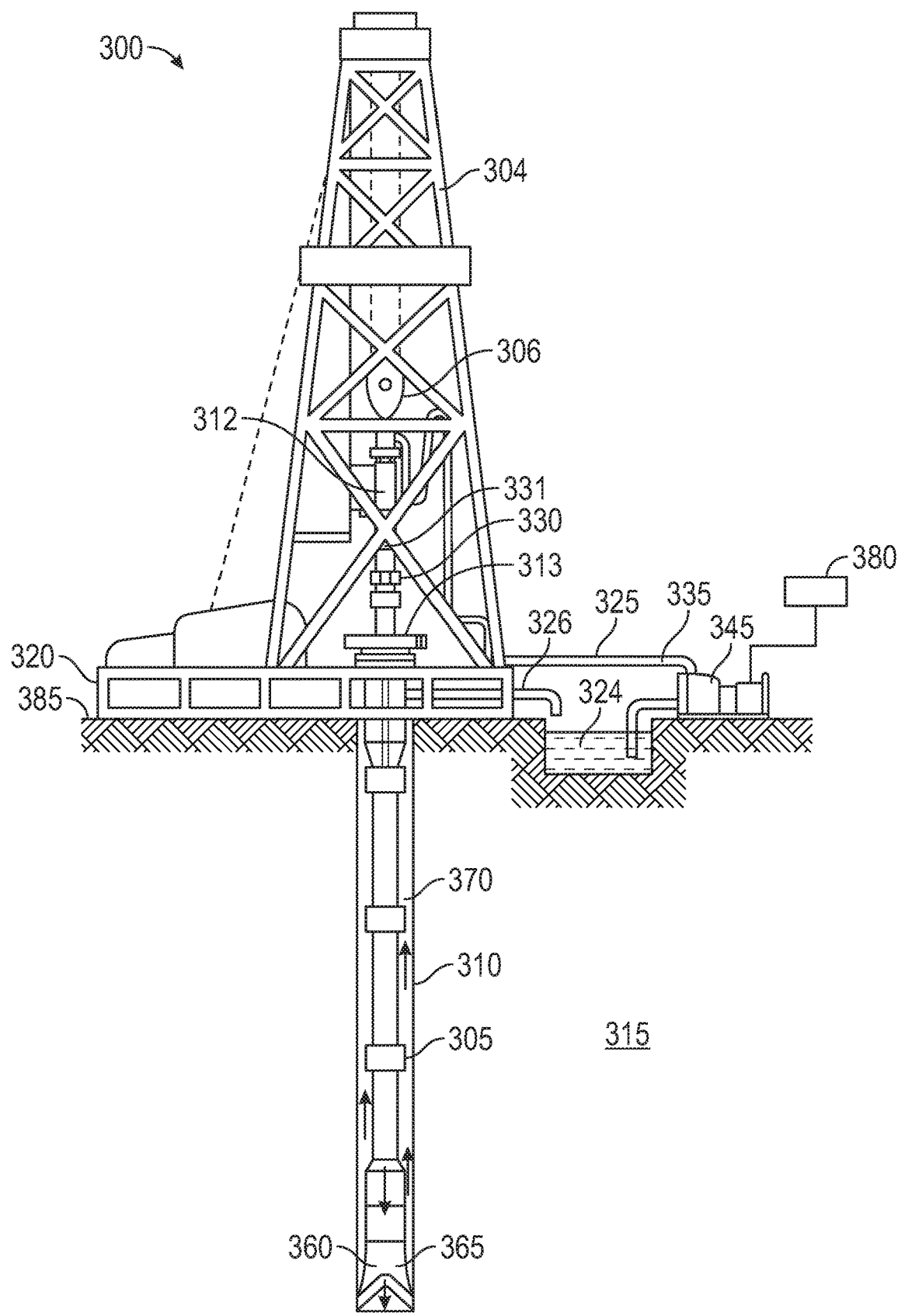
FIG. 3 depicts an exemplary drilling wellbore drilling environment for implementing a wellbore process based on modeling the decay of the microstructure of drilling fluid gel over a time period according to the disclosure herein.

FIG. 3 illustrates an exemplary drilling wellbore drilling environment 300. The wellbore drilling environment 300 has a drill string 305 extending in a wellbore 310 of a formation 315. The drill string 305 extends from a platform 320. As depicted in FIG. 3, the drilling platform 320 is equipped with a derrick 304 that supports a hoist 306 for raising and lowering a drill string 305. The hoist 306 suspends a top drive 312 suitable for rotating the drill string 305 and lowering the drill string 305 through the well head 313. Receiver 330 and processor 331 may be provided for communicating with components in the drill string 305, for example such as by mud pulse telemetry or receiving data generated by measurement while drilling (MWD) or logging while drilling (LWD). Connected to the lower end of the drill string 305 is a drill bit 365. As the drill bit 365 rotates, the drill bit 365 creates the wellbore 310 which passes through various formations 315. A pump 345 circulates drilling fluid 335 through a supply pipe 325 to top drive 312, and as shown by the arrows, down through the interior of drill string 305, through nozzles 360 in drill bit 365, back to the surface via the annulus 370 around drill string 305, through outlet pipe 326 and into a retention pit 324. The drilling fluid 335 transports cuttings from the wellbore 310 into the retention pit 324 and aids in maintaining the integrity of the wellbore 310. A computer 380 with a processor may be communicatively coupled with the pump 345 and/or the device for control of the pump 345 and/or processing received data from pump 345 and/or receiver 330. Various materials can be used for drilling fluid, including oil-based fluids and water-based fluids.

The drilling fluid may have as its base water, or one or more natural oil or synthetic oils and fluids, such as, for example, the esters, olefins, paraffins, and ester blends. The drilling fluid may be a water based emulsion where water is the predominant and continuous phase, and there is an oil phase dispersed in the water, therefor having a discontinuous oleaginous phase. The drilling fluid may be an invert emulsion, having a continuous oleaginous phase and a discontinuous water phase. The water may be in the form of saltwater, brine, seawater, freshwater, and may be any aqueous based solution, and. In instances, the invert emulsions drilling fluids according to this disclosure have an OWR ranging from above 50:50 to about 98:2, including all subranges therein between. Various suitable ranges of oil to water may include for instance, 74:26 and about 80:20, including all sub-ranges therein between about 75:25 or greater, about 80:20 or greater, about 85:15 or greater, or between about 90:10 and 60:40. Various additives may be provided including gelling agents, emulsifiers, weighting agents, organic clays, viscosifiers, emulsifiers, rheology agents, surfactants and shale encapsulators. Sufficient amount of gelling agents and other additives may be added to the base fluid to cause gelation and thixotropic properties and achieve predetermined gel strength at rest. In some instances, the drilling fluid has a density in the range of from about 9 ppg (1080 kg/m3) to about 18 ppg (2160 kg/m³).

Based on this model, wellbore processes can be carried out or adjusted. For instance, upon startup of the drill string 305, or a tripping pipe operation, when a drill string 305 is started, the starting of the drilling fluid pump 345 is delayed, or the rate at which such pump is increased is slowed or delayed due to the gelled drilling fluid. Prior to starting the drill string 305, the drilling fluid is at rest, and due to its thixotropic properties, forms a gel. Upon starting the drill string 305 and turning the drill bit 365, the drilling fluid is placed under shear and the microstructure of the gelled drilling fluid destroyed. However, the decay of the microstructure of the gel takes time. Further, the acoustic wave velocity of starting the drill also requires a period of time to travel from the drill bit 365 to the surface 385, affecting the rate at which pumps are activated to their predetermined or steady state rate. This acoustic wave velocity induces shear on the drilling fluid, thereby degrading the microstructure of the gel. Accordingly, the pump 345 may started up quicker or slower depending the degradation of the microstructure of the gel induced by the starting of the drill and/or the acoustic wave velocity induced by starting the drill. In particular, the rate at which the pump 345 is gradually increased to steady state may be carried out more quickly or more slowly based on the degradation properties of the microstructure of the gel as disclosed herein. For instance, starting a pump quickly or slowly includes the rate at which the pump gradually increases or decreases its pumping rate, such as from its start-up point to reach a predetermined pumping rate, and/or a wait time before starting or stopping the pump from a point in time, such point in time including or based on starting a drilling device. In particular, the model may indicate that the fragile component decays quickly, and therefore, drilling fluid pump 345 may be turned on quicker, such that the rate at which the pump reaches a predetermined rate is increased thereby saving time and increasing wellsite and drilling efficiency. Increasing the pump rate too quickly may result in an ECD sufficiently high that it exceeds the fracture pressure of the wellbore and formation. Accordingly, based on the model, gel the pump 345 may be increased to its predetermined or steady state rate at a slower rate to prevent unwanted fracture or too high an ECD (the exceeding a predetermined value). Accordingly, the pumps may be started faster or slower based on the model and/or the fragile or conventional components.

Therefore, based on the model disclosed herein, the fragile component of the gel can be determined and the startup times of the pump adjusted based on the model, as well as the acoustic wave velocity.

EXAMPLES

The following examples are included to demonstrate example embodiments of the disclosure. It should be appreciated by those of skill in the art that the techniques disclosed in the examples that follow represent techniques discovered by the inventors to function well in the practice of the present disclosure, and thus can be considered to constitute example modes for its practice. However, those of skill in the art should, in light of the present disclosure, appreciate that many changes can be made in the specific embodiments which are disclosed and still obtain a like or similar result without departing from the spirit and scope of the present disclosure.

Figure 4:
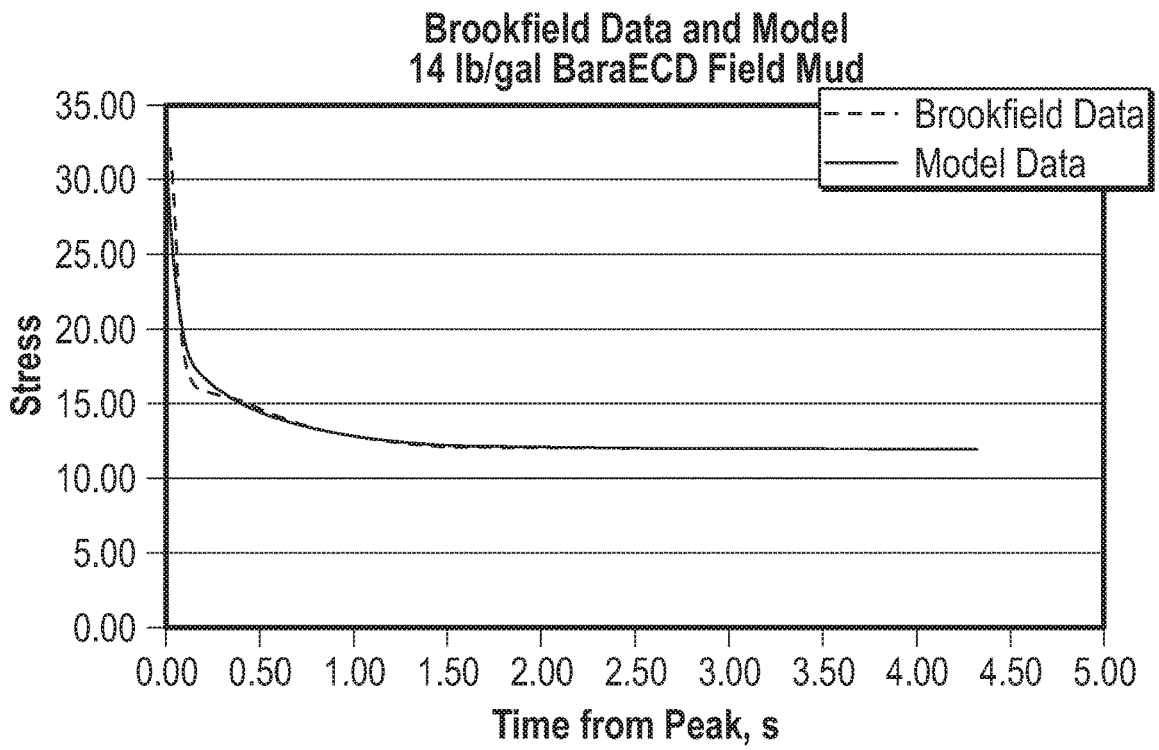
FIG. 4 depicts a graph showing the decay of the microstructure of a gel and an exemplary corresponding model according to the present disclosure.

A drilling fluid gel was characterized according to the model disclosed herein using a Brookfield rheometer similar to the fluid testing system of FIG. 1. Although a Brookfield rheometer was used, any rheometer or viscometer can be used, including the FANN® 35 viscometer by Halliburton Energy Services, Inc. The drilling fluid gel which was tested was a 14.0 lb/gal BaraECD® fluid system by Halliburton Energy Services Inc. In this example, the resting time period where the gel was allowed to rest and a gel forms after an initial shear was 30 minutes. Accordingly, FIG. 4 illustrates a graph showing the actual measured decay period for the drilling fluid gel, starting from the peak gel strength to a final time period where the microstructure of the gel is destroyed. Also shown in the graph is a model of the decay period using the two exponential decay function shown in equation (5), which was solved numerically. As can be seen, the two exponential decay function follows very closely to the actual measured decay data of the fluid gel.

Figure 5:
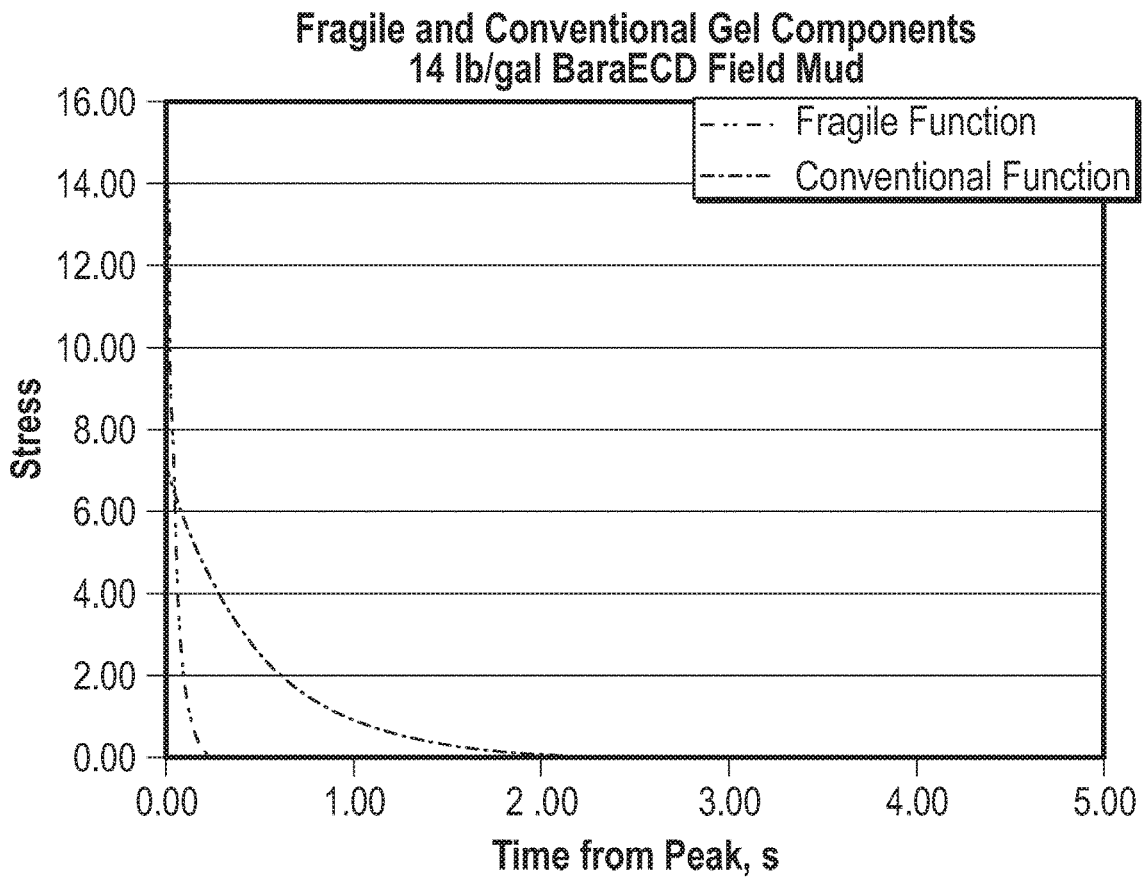
FIG. 5 depicts a graph showing a fast decay component and slow decaying component based on the model of the microstructure decay according the present disclosure.

FIG. 5 illustrates a comparison between the fragile component and the conventional component for the fluid gel model illustrated in FIG. 4. Notably, both the fragile component and the conventional component summed together make up the peak stress. However, surprisingly, the work required to break the gel microstructure was very small for the fragile component, and much larger for the conventional component. In particular, the conventional component was three times greater than the fragile component. Furthermore, as can be seen in FIG. 5, the about one half of the peak gel stress was disrupted in only about 0.2 seconds for the fragile component. The conventional component was about 10 times longer, which can be characterized by the model parameters $1B_0$ and $1B_1$. Based on this determination of 0.2 seconds, a wellbore process can be adjusted. In particular, the start-up time of a pump for drilling or after a tripping operation may be adjusted and speeded due to the short time for the break down of the fragile component. This accordingly reduces the time for startup and tripping operations and thereby improves the efficiency and economics of drilling and wellbore processes.

The data and corresponding model, along with the determination of the fragile and conventional parts of the gel, enables quantitative determination of the instant response of the drilling mud in any gelling time scale. As a result, various wellbore processes can be modified, adjusted, or otherwise carried out based on this model, and in particular, based on the determination of the fragile component.

Figure 6:
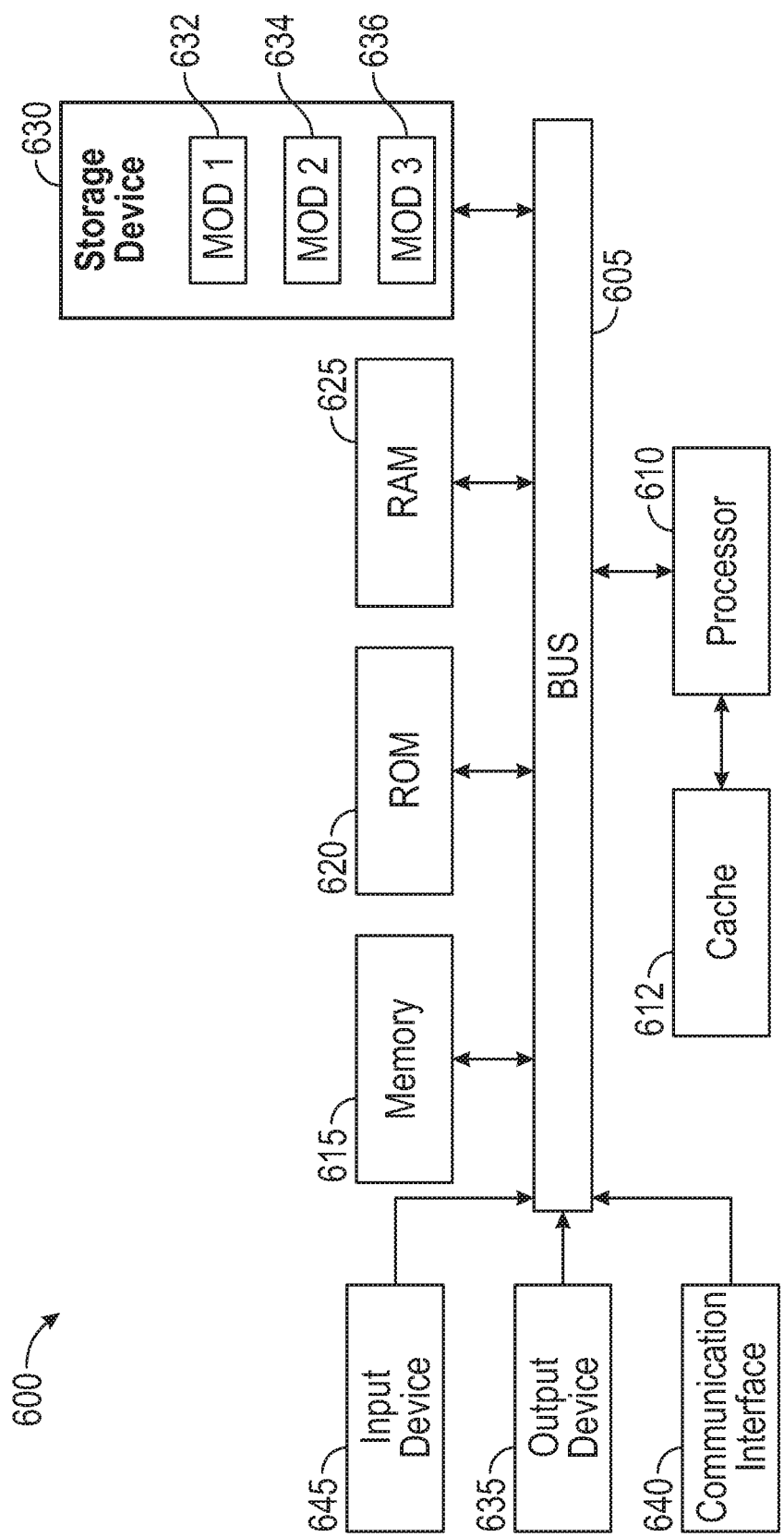
FIG. 6 is a schematic diagram of an example system embodiment.

FIG. 6 illustrates an exemplary computing system for use with example tools and systems (e.g., FIG. 1, FIG. 2), including solving a model based on the two exponential decay functions and equations (1) through (6) as well as conducting drilling and carrying out additional wellbore operations based on the decay model disclosed herein. The more appropriate embodiment will be apparent to those of ordinary skill in the art when practicing the present technology. Persons of ordinary skill in the art will also readily appreciate that other system embodiments are possible.

Specifically, FIG. 6 illustrates system architecture 600 wherein the components of the system are in electrical communication with each other using a bus 605. System architecture 600 can include a processing unit (CPU or processor) 610, as well as a cache 612, that are variously coupled to system bus 605. Bus 605 couples various system components including system memory 615, (e.g., read only memory (ROM) 620 and random access memory (RAM) 625), to processor 610. System architecture 600 can include a cache of high-speed memory connected directly with, in close proximity to, or integrated as part of the processor 610. System architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. Memory 615 can include multiple different types of memory with different performance characteristics. Processor 610 can include any general-purpose processor and a hardware module or software module, such as module 1 (632), module 2 (634), and module 3 (636) stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system architecture 600, input device 645 can represent any number of input mechanisms, such as a microphone for speech, a touch-sensitive screen for gesture or graphical input, keyboard, mouse, motion input, and so forth. An output device 635 can also be one or more of a number of output mechanisms. In some instances, multimodal systems can enable a user to provide multiple types of input to communicate with the computing system architecture 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Numerous statements are provided herein to enhance understanding of the present disclosure. A specific set of statements are provided as follows.

Statement 1: A method, comprising: receiving a measured decay of a microstructure of a gel over a time period in response to a shear stress imposed on the gel exceeding a peak gel strength of the gel; modeling the decay of the microstructure during the time period to form a decay model; and identifying at least two components of the decay model comprising a fast decay component and a slow decay component, wherein the fast decay component decays more quickly than the slow decay component.

Statement 2: The method of Statement 1, comprising: drilling a well bore using the gel, and carrying out an additional wellbore process based on the decay model.

Statement 3: The method according to Statement 1 or 2, wherein the carrying out the wellbore process is based on the fast decay component.

Statement 4: The method according to any of one of preceding Statements 1-3, wherein carrying out the wellbore process comprises activating a drilling pump based on the timing of the fast gel decay and slow gel decay components relative to the acoustic velocity in a fluid in the wellbore.

Statement 5: The method according to any of one of preceding Statements 1-4, further comprising: applying a shear stress to a fluid gel, the gel having a microstructure, the shear stress being applied until a the peak gel strength of the gel is exceeded;

Statement 6: The method according to any of one of preceding Statements 1-5, further comprising: measuring the decay of a microstructure of a gel over the time period after the peak gel strength of the gel is exceeded.

Statement 7: The method according to any of one of preceding Statements 1-6, wherein the shear stress is applied via a blade coupled with a motor.

Statement 8: The method according to any of one of preceding Statements 1-7, wherein the shear stress is measured with a viscometer or rheometer.

Statement 9: The method according to any of one of preceding Statements 1-8, wherein the time period extends from peak gel strength of a gel to a complete degradation of the micro structure.

Statement 10: The method according to Statement 9, wherein the complete degradation of the microstructure corresponds to a shear stress at a preselected steady state shear rate of a viscometer.

Statement 11: The method according to any of one of preceding Statements 1-10, wherein the microstructure of the gel degrades after the peak gel strength is exceeded thereby decreasing viscosity of the gel.

Statement 12: The method according to any of one of preceding Statements 1-11, wherein the model comprises two exponential decay functions.

Statement 13: The method according to any of one of preceding Statements 1-12, wherein the model comprises two exponential decay functions.

Statement 14: The method according to any of one of preceding Statements 1-13, wherein the decay model is based on the following formula: $\sigma(t)=(\sigma_{gel}-A_1)e^{-B_0 t}+A_1 e^{B_1 t}+\sigma_{ss}$ wherein $\sigma$ is shear stress; $\sigma$ is steady state shear stress; t is time $A_1$ is a constant equivalent to a magnitude of the gel stress; $B_0$ and $B_1$ are decay time constants solved numerically based on the received measured decay of the microstructure of the gel over a time period.

Statement 15: The method according to Statement 14, wherein at least one of the exponential functions $(\sigma_{gel}-A_1)e^{-B_0 t}$ or $A_1 e^{B_1 t}$ corresponds to the fast component and the other the slow component.

Statement 16: A system comprising: one or more processors; and a non-transitory memory coupled to the one or more processors, wherein the memory comprises instruction configured to cause the processors to perform operations for: receiving a measured decay of a microstructure of a gel over a time period in response to a shear stress imposed on the gel exceeding the peak gel strength of the gel; modeling the decay of the microstructure during the time period to form a decay model; identifying at least two components of the decay model comprising a fast decay component and a slow decay component, wherein the fast decay component decays more quickly than the slow decay component.

Statement 17: The system according to Statement 16, wherein the decay model is based on the following formula: $\sigma(t)=(\sigma_{gel}-A_1)e^{-B_0 t}+A_1 e^{B_1 t}+\sigma_{ss}$ wherein $\sigma$ is shear stress; $\sigma$ is steady state shear stress; t is time $A_1$ is a constant equivalent to a magnitude of the gel stress; $B_0$ and $B_1$ are decay time constants solved numerically based on the received measured decay of the microstructure of the gel over a time period.

Statement 18: The system according to Statements 16 or 17, wherein at least one of the exponential functions $(\sigma_{gel}-A_1)e^{-B_0 t}$ or $A_1 e^{B_1 t}$ corresponds to the fast component and the other the slow component.

Statement 19: The system according to any of one of preceding Statements 16-18 wherein the measured decay of the microstructure of the gel over the period of time is obtained based on applying a shear stress to a fluid gel, the gel having a microstructure, the shear stress being applied until a the peak gel strength of the gel is exceeded.

Statement 20: The system according to any of one of preceding Statements 16-19, wherein the shear stress was applied via a blade coupled with a motor.

What is claimed is:

1. A method, comprising:
receiving a measured decay of a microstructure of a gelled fluid over a time period in response to a shear stress imposed on the gelled fluid exceeding a peak gel strength of the gelled fluid;
modeling the decay of the microstructure during the time period to form a decay model;
identifying at least two components of the decay model comprising a fast decay component and a slow decay component, wherein the fast decay component decays more quickly than the slow decay component;
initiating operation of a drill; and
activating a drilling pump based on timing of the fast decay component and the slow decay component relative to an acoustic velocity of the gelled fluid.

2. The method of claim 1, comprising:
drilling a wellbore using the gelled fluid and carrying out an additional wellbore process based on the decay model.

3. The method of claim 1, further comprising:
applying the shear stress to the gelled fluid, the gelled fluid having the microstructure, the shear stress being applied until the peak gel strength of the gelled fluid is exceeded.

4. The method of claim 1, further comprising:
measuring the decay of the microstructure of the gelled fluid over the time period after the peak gel strength of the gelled fluid is exceeded.

5. The method of claim 1, wherein the shear stress is applied via a blade coupled with a motor.

6. The method of claim 1, wherein the shear stress is measured with a viscometer or rheometer.

7. The method of claim 1, wherein the time period extends from the peak gel strength of the gelled fluid to a complete degradation of the microstructure.

8. The method of claim 7, wherein the complete degradation of the microstructure corresponds to a shear stress at a preselected steady state shear rate of a viscometer.

9. The method of claim 1, wherein the microstructure of the gelled fluid degrades after the peak gel strength is exceeded thereby decreasing viscosity of the gelled fluid.

10. The method of claim 1, wherein the decay model includes an exponential decay function.

11. The method of claim 1, wherein the decay model includes two exponential decay functions.

12. The method of claim 1, wherein the decay model is based on the following formula:

$$\sigma(t)=(\sigma_{gel}-A_1)e^{-B_0 t}+A_1 e^{B_1 t}+\sigma_{ss}$$

wherein
$\sigma$ is shear stress;
$\sigma_{ss}$ is steady state shear stress;
t is time
$A_1$ is a constant equivalent to a magnitude of the gel stress;
$B_0$ and $B_1$ are decay time constants solved numerically based on the received measured decay of the microstructure of the gel over a time period.

13. The method of claim 12, wherein at least one of a first exponential function $(\sigma_{gel}-A_1)e^{-B_0 t}$ or a second exponential function $A_1 e^{B_1 t}$ corresponds to the fast decay component and the other the slow decay component.

14. A system comprising:
one or more processors; and
a non-transitory memory coupled to the one or more processors, wherein the memory comprises instruction configured to cause the one or more processors to perform operations for:

receiving a measured decay of a microstructure of a gelled fluid over a time period in response to a shear stress imposed on the gelled fluid exceeding peak gel strength of the gelled fluid;

modeling the decay of the microstructure during the time period to form a decay model;

identifying at least two components of the decay model comprising a fast decay component and a slow decay component, wherein the fast decay component decays more quickly than the slow decay component and a wellbore is drilled when the gelled fluid is in the wellbore; and activating a drilling pump based on timing of the fast decay component and the slow decay component relative to an acoustic velocity of the gelled fluid.

15. The system of claim 14, wherein the decay model is based on the following formula:

$$\sigma(t)=(\sigma_{gel}-A_1)e^{-B_0 t}+A_1 e^{B_1 t}+\sigma_{ss}$$

wherein $\sigma$ is shear stress;

$\sigma_{ss}$ is steady state shear stress;

t is time $A_1$ is a constant equivalent to a magnitude of the gel stress;

$B_0$ and $B_1$ are decay time constants solved numerically based on the received measured decay of the microstructure of the gel over a time period.

16. The system of claim 15, wherein at least one of a first exponential function $(\sigma_{gel}-A_1)e^{-B_0 t}$ or a second exponential function $A_1 e^{B_1 t}$ corresponds to the fast decay component and the other the slow decay component.

17. The system of claim 14 wherein the measured decay of the microstructure of the gel over the period of time is obtained based on applying the shear stress to the gelled fluid, the gelled fluid having the microstructure, the shear stress being applied until the peak gel strength of the gelled fluid is exceeded.

18. The system of claim 17, wherein the shear stress was applied via a blade coupled with a motor.

* * * * *